Patented Aug. 15, 1944

2,355,638

UNITED STATES PATENT OFFICE 2,355,638

COLOR MARKING ELEMENT

Monie A. Ferst and Charles F. Wysong, Atlanta, Ga., assignors to M. A. Ferst, Ltd., Atlanta, Ga., a corporation of Georgia No Drawing. Application May 1, 1943, Serial No. 485,362

7 Claims. (Cl. 120—83)

The invention relates to color marking elements and has as an object the provision of a colored marking element that will be smooth in use and that can be utilized to provide a lead of color marking material of either the crayon or copying type, that is, a marking material in which the mark either is or is not water soluble.

It is a further object of the invention to provide a color marking element whose skeletal structure is unaffected by moisture or age deleteriously.

It is a further object of the invention to provide a white or near white ceramic body of skeletal structure which will have controlled porosities and will carry an impregnant.

Further objects will appear from the following description of an illustrative embodiment of the invention.

It has been proposed in patent to Bugbee No. 1,502,763, dated July 29, 1924, to produce a colored marking element of the nature here proposed. As there described the lead is produced by making a porous clay body and filling the pores with the coloring or colored marking material. It has been found that the marking bodies produced in accordance with the disclosure of that patent are vastly inferior to those produced at present by the gum-bonding method. It is impossible under that patent to obtain an acceptable or practical balance between strength, softness, and smoothness.

In accordance with the present invention a mixture of clay combined with a material of a character which when the material is fired, will be softer than the fired clay, to produce in the fired clay portion of the finished body masses of softer material separating the fired clay portions into thin lamellae, so that the fired clay portions may be made friable, the fired clay and softening material being then caused to produce a skeleton of materials surrounding open pores of minute size. The proportion of clay may be from 5% to 70%.

The softening material preferred for use is a non-plastic hydrous silicate such as talc, pyrophyllite or mica, raw or calcined. It is desirable to increase the porosity of the bodies above what would normally be obtained and for this purpose a material that can be oxidized, volatilized or extracted by a solvent is added to the batch of clay and softening material at any one of several points in the mixing operation. The amount of this addition is varied to obtain the desired balance between porosity and writing degree.

For obtaining the most satisfactory leads, it is necessary to control the porosity carefully. There are two important features effected by variations in porosity. First, the amount of impregnant can be varied to control certain properties such as intensity of mark or copy and second, the degree of hardness and softness is altered by this property. This does not imply that all variations of hardness and softness are controlled by this method. Such an end is obtained only by the proper balance between porosity, clay-softening material mixture, and impregnant.

For obtaining and controlling high porosities we choose to use any of a variety of materials which can be removed after forming, by oxidation, volatilization, or extraction with solvent. The proportion of materials used for obtaining high porosities can be one part of the pore forming material to four parts of the clay-softening material mixture up to two parts of the pore forming material to one part of the clay-softening material mixture. The material chosen for this purpose is added to the batch of clay-softening material mixture at any of several points in the mixing operation and remains in the body during the forming operation. It is later removed by one of the suggested methods.

Thus, if carbon black were chosen for the oxidizable material to increase porosity it would be combined with a clay-softening material mixture in a plastic condition and formed into the desired shapes, dried and fired to the optimum temperature under reducing conditions. We would then choose to remove the carbon as the monoxide or the dioxide under oxidizing conditions at a temperature equal to or lower than the previous maturing temperature. The dry body of carbon black, clay-softening material mixture can, also, be fired to the optimum temperature under oxidizing conditions removing the carbon during the firing.

Thus, if naphthalene were chosen for the volatile material to increase porosity it would be combined with a clay-softening material mixture in a plastic condition and formed into the desired shapes, dried and fired to the optimum temperature. The naphthalene, however, could be volatilized during the drying stage or could be volatilized during the early firing stages.

Thus, if finely divided copper or copper oxide reducible to free metal under firing conditions were chosen for the material to be extracted by a solvent to increase porosity, it would be combined with a clay-softening material mixture in a plastic condition and formed into the desired shapes, dried and fired to the optimum temperature. We would then choose to remove the copper with a solvent such as a weak acid or base.

After the skeletal structure of high porosity has been produced it is impregnated. The impregnant is understood to and can include any and all fluids and/or solvents and/or all solids which can be converted into fluids by solvents or heat. Among such impregnants are oily material, waxy material, wax soluble material, water soluble material, water soluble waxy material, wax soluble coloring material, water soluble coloring material, water soluble waxy coloring material, water soluble salts, or a combination of any or all of these. It would, also, include soluble material which can be precipitated in the skeletal structure.

When wax is used as the impregnant, it is obvious that to be useful it must be solid at atmospheric temperatures—say up to 154° F., and it must be liquefiable at some temperature above atmospheric in order to be introduced into the pores of the element.

A pencil lead made in accordance with the invention will be a color marking element that will be smooth in use and of either the crayon or copying type in which the mark either is or is not water soluble.

A pencil lead made in accordance with the invention will be a color marking element whose skeletal structure is a porous ceramic body which will be unaffected by water or age deleteriously.

A pencil lead made in accordance with the invention will have a white or near white body of skeletal structure with controlled porosities which can be filled with an impregnant.

Minor changes may be made in the steps of the process or in the characteristics of the article produced thereby within the scope of the appended claims, without departing from the spirit of the invention.

We claim:
1. A color marking element comprising: a friable ceramic body including fired clay and a non-plastic hydrous silicate, said body having pores filled with a coloring impregnant.
2. A color marking element comprising: a formed and fired body including a mixture of clay and talc, said body having pores filled with coloring impregnant.
3. A color marking element comprising: a formed and fired body including a mixture of clay and pyrophyllite, said body having pores filled with coloring impregnant.
4. A color marking element comprising: a formed and fired body including a mixture of clay and mica, said body having pores filled with coloring impregnant.
5. A color marking element comprising: a skeletal ceramic body comprising from 5% to 70% clay mixed with 95% to 30% non-plastic hydrous silicate and having its pores filled with a color impregnant.
6. A marking element comprising a porous ceramic body of fired clay and a non-plastic hydrous silicate having pores left by removal of a discrete substance present when the body is formed.
7. In a marking element, a skeletal body comprising lamellae of fired ceramic bonding material interspersed with masses of softer substance to increase the friability of said body as affected by friction with a writing surface; said skeletal body enclosing pores of volume in excess of those normally existing between the particles of material composing the skeletal material; said pores filled with an impregnating substance which is fluid at some temperature above 154° F.; at least one of said substances comprising a marking material.

MONIE A. FERST.
CHARLES F. WYSONG.